United States Patent [19]

Houman

[11] Patent Number: 4,478,355
[45] Date of Patent: Oct. 23, 1984

[54] SOFT DESSERT DISPENSING ARRANGEMENT

[75] Inventor: Leif Houman, Oyster Bay, N.Y.

[73] Assignee: Medetec Industries, Inc., Locust Valley, N.Y.

[21] Appl. No.: 371,217

[22] Filed: Apr. 23, 1982

[51] Int. Cl.³ .................. B67D 5/08; G04C 23/38
[52] U.S. Cl. ........................... 222/54; 222/63; 222/641; 222/644; 222/504; 222/509
[58] Field of Search ............. 222/14, 54, 55, 63, 222/638-644, 333, 504, 505, 509, 511, 518, 129.1

[56] References Cited

U.S. PATENT DOCUMENTS

| | | | |
|---|---|---|---|
| 3,276,633 | 10/1966 | Rahauser | 222/129.1 |
| 3,456,839 | 7/1969 | Glisenti | 222/638 |
| 4,202,387 | 5/1980 | Upton | 222/54 X |

FOREIGN PATENT DOCUMENTS 1012187 12/1965 United Kingdom ................ 222/639

Primary Examiner—Joseph J. Rolla
Assistant Examiner—Kevin P. Shaver
Attorney, Agent, or Firm—Scully, Scott, Murphy & Presser

[57] ABSTRACT

A soft dessert dispensing arrangement in which a dispenser is responsive to manual actuation by an operator to dispense soft dessert over a given time period, as measured by an electrical timing circuit. Changes in important parameters affecting the pumping rate of the dessert, such as the pressure and temperature of the pumped dessert and the elapsed time since the last dispensing operation, are compensated for by adjusting the given time period to provide for the dispensing of a substantially constant quantity of dessert despite the changed parameters. The electrical timing circuit is responsive to an input resistance to measure the given time period, and the resistance applied to the timing circuit changes in accordance with sensed variations in the aforementioned parameters.

9 Claims, 5 Drawing Figures

SOFT DESSERT DISPENSING ARRANGEMENT

BACKGROUND OF THE INVENTION

1. Field of the Invention

The present invention relates generally to a dispensing arrangement for partially solidified materials such as sherbets, soft ice creams and yogurts, and more particularly pertains to a dispenser of the aforementioned kind which delivers a precisely quantified portion of such materials on a controlled and repetitive basis.

2. Description of the Prior Art

Many types of apparatus are known in the prior art for dispensing partially solidified desserts such as sherbets soft ice creams, and yogurts. The dispensing arrangments normally have a dispensing nozzle, a valve associated therewith to control the dispensing operation, and a pump for feeding soft desserts to the nozzle. Manually controlled dispensing arrangements, wherein an operator controls operation of the dispensing valve, have some serious disadvantages associated therewith. The operator should maintain the dispensing valve open for a relatively constant time period over and over again in a repetitive manner, as the time the valve is open substantially determines the amount of dessert delivered for collection on top of cones, cups, wafers or the like. Moreover, a further disadvantage of this type of dispensing arrangment is that it often requires the presence of supervisory personnel to assist unskilled operators in the performance of their duties to prevent the delivery of either too little dessert, resulting in customer dissatisfaction, or too much dessert, resulting in an overdelivery for that purchase. This can be a relatively severe problem as the profits from this type of retail business are often related directly to the quantity of dessert dispensed on a repetitive basis.

An improvement over manually controlled dispensers is the provision of a timer controlled dispensing arrangement wherein the dispensing valve is maintained open for a given period of time determined by a timer. Simonich U.S. Pat. No. 3,399,809 discloses an ice cream vending machine having a mechanical timer therein such that a motor driven rotation of a mechanism results in a dispensing operation over a given fixed time period. Vollmer, Sr. U.S. Pat. No. 3,054,534 and Glisenti U.S. Pat. No. 3,456,839 disclose dispensing arrangements wherein an electrical timing circuit measures a given time period during which a soft dessert such as ice cream is dispensed. Unfortunately, these prior art dispensing arrangements do not offer a sufficient amount of flexibility to accommodate changes in important parameters which affect the dispensing operation, particularly those which influence the quantity of dessert dispensed during a given time period.

SUMMARY OF THE INVENTION

Accordingly, it is a primary object of the present invention to provide a dispensing arrangement for dispensing accurately controlled portions of partially solidified desserts such as sherbets, soft ice creams and yogurts.

A further object of the subject invention is the provision of a dispensing arrangement of the aforementioned kind which vends the desserts for given time periods which are altered to compensate for changed parameters in the vending process. Moreover, an important objective of the present invention is to provide a dispensing arrangement as described which can be retrofitted to existing dispensing machines without a substantial amount of modification thereof.

In accordance with the teachings herein, the present invention provides a soft dessert dispensing arrangement in which a dispenser is responsive to manual actuation by an operator to dispense soft dessert over a given time period as measured by a timer. In this arrangement changes in important parameters affecting the pumping rate of the dessert such as the temperature and pressure of the pumped dessert and the elapsed time since the last dispensing operation are compensated for by adjusting the given time period to provide for the dispensing of a substantially constant quantity of dessert despite the changed parameters. The pressure of the pumped dessert at the dispensing outlet of the arrangement appears to be particularly critical in this regard as a typical prior art soft dessert dispensing machine loses a substantial percentage of its initial dispensing pressure after a small quantity of dessert is dispensed. Moreover, the loss of dispensing pressure results in a directly commensurate slowing down in the dispensing rate of the soft dessert.

The timer preferably comprises an electrical timing circuit which is responsive to an input resistance to measure a given time period, and the resistance applied to the timing circuit is changed in accordance with variations in important dispensing parameters.

In a preferred embodiment a single electrical timing circuit is responsive to the selection of different size portions in an arrangement wherein different resistors are selectively switched into the timing circuit. Desserts such as frozen sherbets tend to solidify if not dispensed on a regular basis, and accordingly, a second timer measures the time duration since the last vending operation, and if it is longer than a given time period such as five minutes, an additional resistor is switched into the electrical timer to shorten the dispensing time to compensate for the resultant greater pumping rate of the more solidified dessert. A temperature transducer such as a thermistor, the resistance of which varies in relation to the temperature of the soft dessert, is also coupled to the timing circuit to compensate for changes in temperature of the dispensed dessert which would otherwise affect the dispensed quantity. A dessert pump, preferably in the form of a motor driven screw auger pump, is utilized to deliver the dessert during a vending operation, and a pressure transducer measures the pressure the pump is exerting on the soft dessert and provides a variable resistance in response thereto as an input to the timing circuit.

In one disclosed embodiment a manually actuated dispensing lever is mechanically coupled to the plunger of a plunger-operated dispensing valve to be displaced thereby to an open valve position upon manual operation of the dispensing lever. A switch is also closed by manual operation of the dispensing lever to supply electrical power to the dispensing pump and also to actuate the timing circuit at the initiation of a dispensing operation. The dispensing valve is spring biased closed, and a latch is utilized to hold the valve open during a vending operation. At the end of the timed period, a solenoid withdraws the latch from the dispensing valve, thereby allowing the valve to be spring biased closed. In greater detail, a second plunger is spring biased against one end of the plunger valve to spring bias the valve towards a closed position. The second plunger has a radially directed recess therein, into which the latch is spring biased to latch the valve in an open position. The solenoid, upon actuation at the end of a timing period, withdraws the latch from the radially directed recess to allow the dispensing valve to be spring biased closed.

BRIEF DESCRIPTION OF THE DRAWINGS

The foregoing objects and advantages of the present invention for a soft dessert dispensing arrangement may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
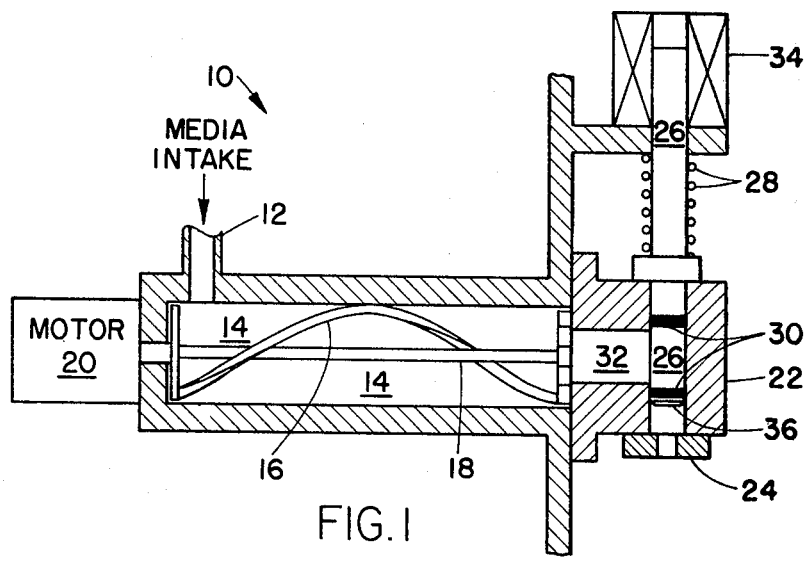
FIG. 1 is a sectional elevational view of a first exemplary embodiment of a soft dessert dispensing arrangement.

Referring to the drawings in detail, FIG. 1 is an elevational sectional view of a dispensing arrangement 10 for partially solidified materials such as sherbets, soft ice cream and yogurts wherein a mixture of the materials is introduced through a feed tube 12 into a chamber 14 which is refrigerated to a temperature to maintain the dessert at a proper consistency. A screw auger 16 mounted about shaft 18 is rotationally driven by a motor 20 to agitate or mix the dessert and also to pump it through a dispensing valve 22 to a dispensing nozzle 24.

Dispensing valve 22 has a plunger 26 biased by a spring 28 to a closed valve position (as shown in FIG. 1) in which a pair of 0 ring seals 30 are provided on the plunger above and below a material feed conduit 32 from chamber 14. A solenoid 34 on the upper end of plunger 26 is actuated to open the dispenser valve against the bias of spring 28, which lifts the bottom surface 36 of the plunger above the material feed conduit 32, thereby allowing the dessert product to flow under the influence of auger pump 16 through dispensing nozzle 24. Pursuant to the teachings of the present invention, a predetermined quantity of soft dessert is dispensed through the arrangement by actuating solenoid 34 for a given period of time which is alterable to compensate for process variables such as the temperatures of the dessert and the pressure generated by the dispensing pump.

Figure 2:
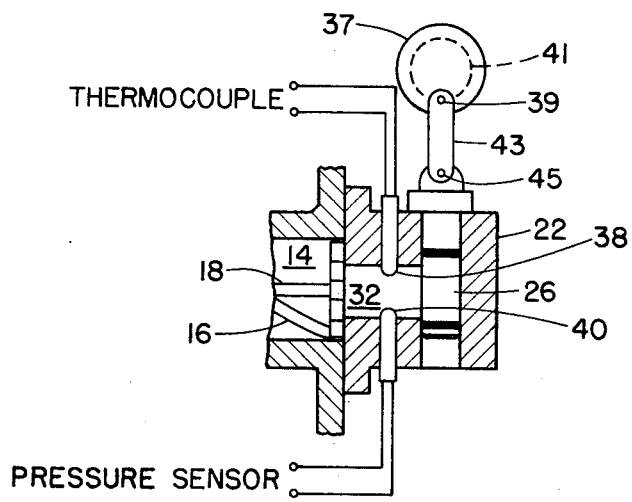
FIG. 2 illustrates the dispensing arrangement of FIG. 1 modified in accordance with the teachings of the present invention.
Figure 5:
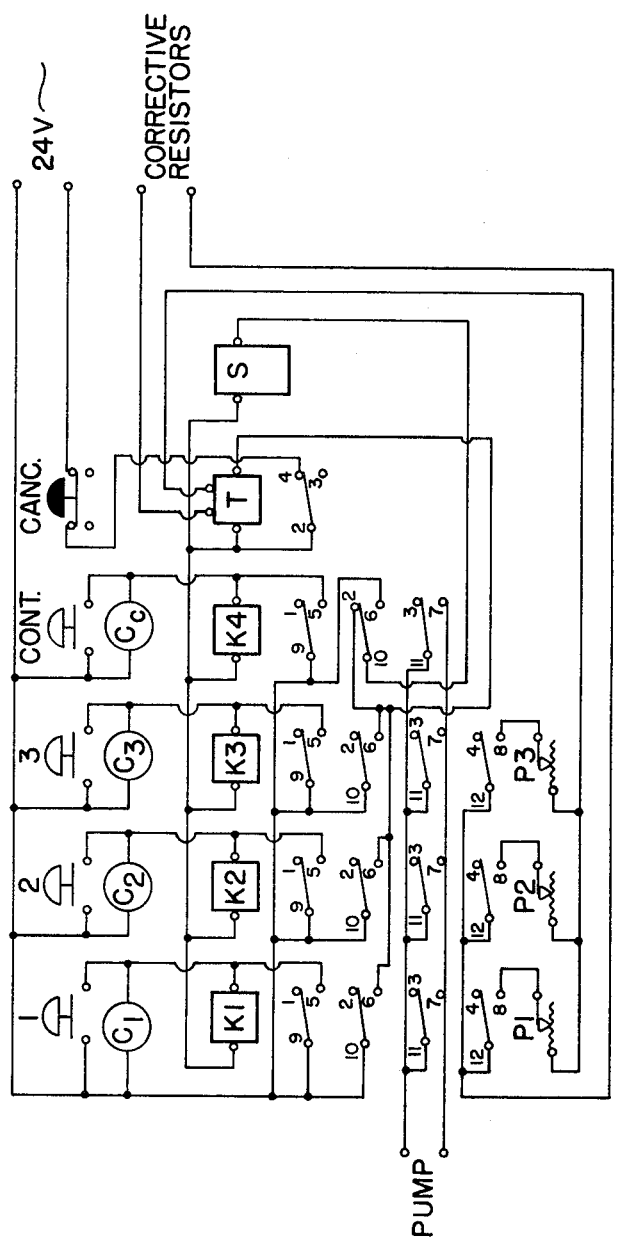
FIG. 5 is an electrical schematic of a circuit for modifying the dispensing time periods in accordance with the detected temperature and/or pumping pressure of the dispensed material.

As illustrated in FIG. 2, the dispensing arrangement is modified by the addition to material feed conduit 32 of a temperature sensing transducer 38 such as a commercially available thermocouple or thermistor bead having a resistance which varies inversely in porportion to the sensed temperature. A pressure transducer 40 also senses the pumping pressure generated in the feed conduit 32 by the screw auger pump 16, and its resistance varies in proportion to the sensed pressure. The signals from these transducers are then utilized in a circuit as illustrated in FIG. 5 to modify a given period of time to compensate for changes of temperature or pressure in the pumped soft dessert. The pressure of the pumped dessert in the feed conduit 32 is an important parameter as a typical auger dispensing machine as illustrated loses a substantial percentage of its initial dispensing pressure after a small quantity (e.g. 3 ounces) of dessert is despensed. Further, this loss of pressure results in a directly commensurate slowing down in the dispensing rate of the soft dessert. The pressure transducer 40 can be any suitable design, such as a movable pressure responsive diaphragm which has different contacts connecting to different resistors depending upon the position of the diaphragm.

FIG. 2 also illustrates a different actuating arrangement for the plunger 26 in which a motor 37 drives an output pin 39 in a circular path 41. A linkage rod 43 connects to a pin 45 which is coupled directly to the top of the plunger 26. FIG. 2 illustrates the plunger in a closed position. Upon actuation of the vending arrangement, the motor 37 rotates through 180°, which positions pin 39 at the top of circular path 41, thereby retracting upwardly the plunger 26 through linkage 43 and pin 45. The motor is deactivated in this position for a given length of time, during which dessert is dispensed from the machine, and is then actuated again for a further 180° rotation to return it to the position shown in FIG. 2. Motors of this type are well known in the art, and accordingly will not be explained further herein. One advantage of the actuating arrangement of FIG. 2 is that it is easily retrofitted to many soft dessert dispensing machines currently in commercial usage, such as those manufactured by the Taylor Company.

Figure 4:
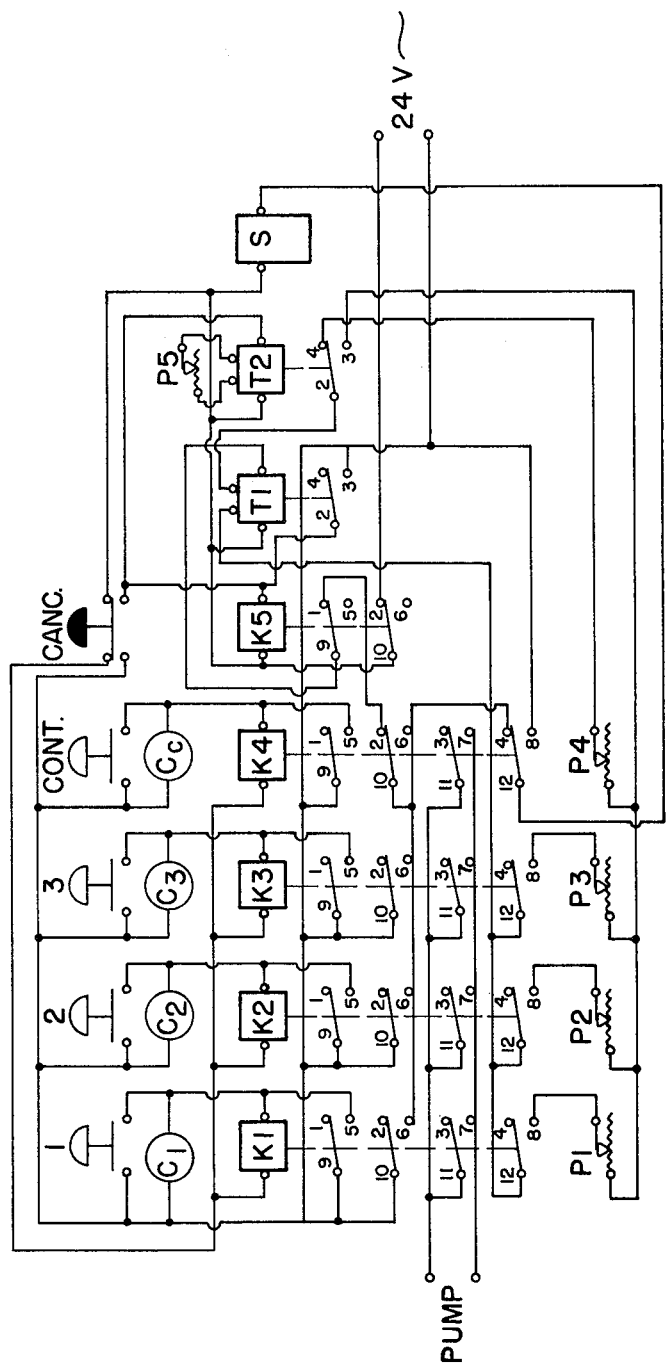
FIG. 4 is an electrical schematic of a circuit for controlling the dispensing time periods of the dispensing arrangements disclosed herein.

Referring to FIG. 4, a control circuit for the pumping arrangement includes five control switches, three pushbutton switches, labeled 1, 2 and 3 to select a vended portion of either small, medium or large size. A pushbutton switch labeled CONT. selects a continuous mode of vending, while a pushbutton switch labeled CANC. cancels any mode of operation. Taking press button switch 1 as an example, depression thereof activates solenoid $K_1$ which closes four switches mechanically coupled thereto to contacts 9-5, 10-6, 11-7 and 12-8. Contacts 9-5 render the solenoid $K_1$ self-latching such that switch 1 can be released without affecting operation of the circuit. Contacts 10-6 activate a commercially available timing relay $T_1$ which opens after a given period of time determined by the external resistance applied thereto. Contacts 11-7 apply 24 volts AC power to the vending solenoid 34 and also to the pump motor 20 for the screw auger pump 16. Contacts 12-8 establish a conduction path between a variable resistor in the form of a potentiometer $P_1$ and the timing relay $T_1$. Actuation of relay $T_1$ also results in resetting of relay $T_2$ for purposes explained below.

In this arrangement timer relay $T_1$ changes its state after a given period of time determined by the resistance applied thereto, which includes the adjustable resistance $P_1$. The change in state of timing relay $T_1$ deactivates relay $K_1$ which results in a termination of the 24 volts AC power supply applied to pumping motor 20 and the solenoid 34.

Depression of pushbutton switch 1 also functions to increment a counter $C_1$ coupled across switch 1 such that a record is maintained of the number of dispensing operations for small size desssert portions.

Selection of pushbutton switches 2 or 3 results in actuation of the vending arrangement in substantially the same manner, except either of variable resistor potentiometers $P_2$ or $P_3$ is now connected to variable timer relay $T_1$. Accordingly, the resistance of potentiometer $P_2$ is set to maintain timer relay $T_1$ actuated for a slightly longer period of time to result in vending of a medium portion of soft dessert, while the resistance of potentiometer $P_3$ is set to maintain timer relay $T_1$ actuated for a still longer time period to vend a large portion of soft dessert.

Depression of CONT. mode switch operates in the same manner, except that timer relay $T_1$ does not have a resistance applied thereto, which results in it not resetting relay $K_4$. In this mode of operation, only depression of the cancel switch CANC. will terminate the vending operation. Depression of cancellation switch CANC. results in an interruption of the power supply to all of the solenoids, thereby terminating all vending operations.

As explained previously, actuation of timer relay $T_1$ by any selection switch resets timer relay $T_2$, which is a five minute timer included in the circuit for the following reasons. If a frozen dessert such as sherbet is not vended within five minutes of a previous vending operation, the lack of pumping and mixing by the auger screw 16 results in the sherbet in refrigerated chamber 14 becoming thicker in texture, which results in a greater quantity of dessert being dispensed with a given time period. Accordingly, if timer relay $T_2$ has not been reset with the previous five minutes, its state is such that it connects a variable resistance $P_5$ in series with either of resistances $P_1$ or $P_2$ or $P_3$ such that the given time duration measured by timing relay $T_1$ is shortened by an appropriate length of time to dispense the proper quanitity of dessert.

The counters $C_1$, $C_2$, $C_3$ and $C_c$ which are incremented by each dispensing operation are particularly advantageous in conjunction with the teachings of the present invention as they allow an accurate accounting and auditing function to be maintained for the dessert dispensing operation.

The circuit of FIG. 5 operates in substantially the same manner as that of FIG. 4, with an additional change in a given vending time period being included in the vending process to compensate for changes in the temperature or more importantly the pressure of the frozen, partially solidified dessert. The primary purpose of this embodiment, as with previously described embodiments, is to vend predetermined quantities of dessert in different size portions by vending the dessert for given time periods which can be altered to compensate for changed parameters in the vending process. It was noted in the explanation of the circuit of FIG. 4 that a frozen dessert such as sherbet changes consistency if it remains unvended for lengthy periods of time, generally in excess of five minutes, as it remains unagitated by auger screw 16 during those lengthy time periods. Further, the pumping pressure of the dessert drops after a relatively small quantity thereof is dispensed, and the loss of pressure results in a commensurate slowing down of its dispensing rate. Accordingly, the embodiment of FIG. 5 directly measures important parameters of the pumped dessert, such as its temperature and pressure, and utilizes those direct measurements to change the given vending time periods. In this circuit, the variable resistance of thermistor bead 38 or pressure transducer 40, or both in series, is placed in series with either of resistances $P_1$ or $P_2$ or $P_3$ to compensate in the given vending time periods for changed characteristics of the pumped dessert.

Figure 3:
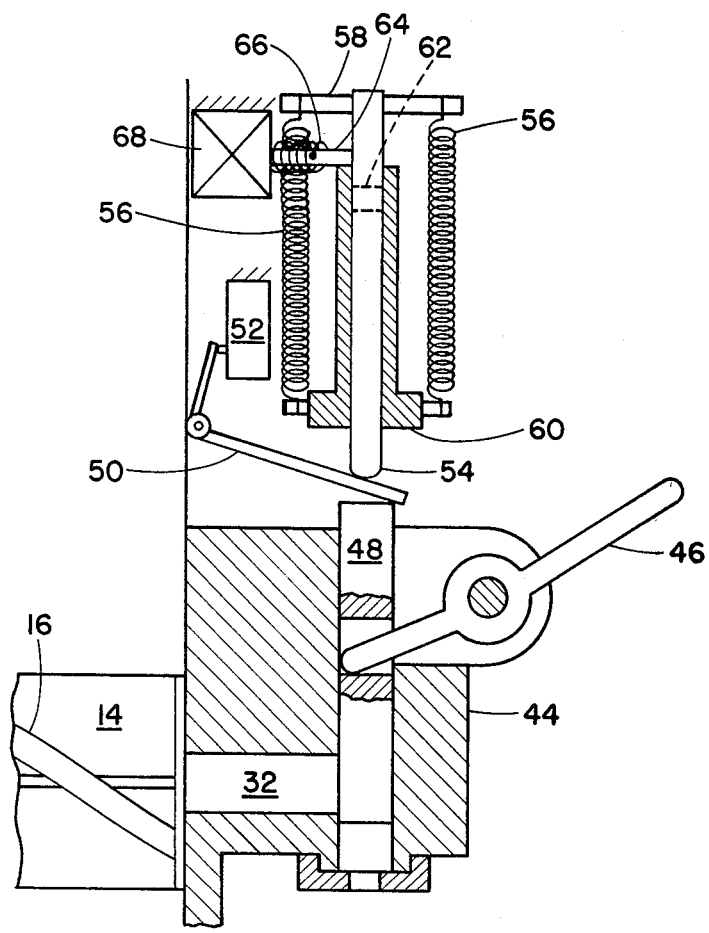
FIG. 3 illustrates a sectional elevational view of a further dessert dispensing arrangement constructed pursuant to the present invention.

FIG. 3 illustrates a further embodiment of a vending arrangement pursuant to the teachings of the present invention in which a vending control plunger valve 44 is controlled by a manually actuated dispensing lever 46. Pulling down on lever 46 results in an upward movement of plunger 48 toward an open position of the valve. Upward movement of plunger also rotates L shaped switch lever 50 which closes a microswitch 52. In the context of the vending control circuits described thus far, closure of switch 52 activates the vending pump motor 20, a holding relay such as $K_1$ and a timer relay such as $T_1$.

A second plunger shaft 54 is axially disposed relative to the first plunger shaft 48 such that it is urged in an upward direction by shaft 48 against the bias of tension springs 56 which are coupled between a pin 58 extending through the upper end of shaft 48 and a relatively stationary housing 60. Accordingly, in this arrangement tension springs 56 bias plunger 48 downwardly toward a closed postion The second plunger shaft 54 has a radial recess or bore 62 therein which moves upward with the shaft 54 until it is aligned with a radially oriented bolt 64. Bolt 64 is urged against shaft 54 by a compressive spring 66 such that it latches into recess 62, thereby maintaining the plunger valve 44 in an open position.

At the expiration of the measured time interval by a timer relay such as $T_1$, solenoid 68 is actuated to withdraw bolt 64 from recess 62, thereby enabling tension springs 56 to urge plungers 54 and 48 downwardly to close valve 44. Accordingly, during operation of this embodiment, lever 46 is pulled downwardly until bolt 64 engages recess 62, at which time lever 46 can be released. After passage of a measured vending time duration period, solenoid 68 is actuated to close the vending valve 44. This embodiment also advantageously provides the operator with the option of manually closing the vending valve by exerting downward pressure on lever 46 prior to the end of the measured time period.

The embodiments described thus far herein include spring biased and solenoid operated valves. However, it should be recognized that pneumaticly or hydraulicly operated valves are equally applicable within the context of the teachings of the present invention.

While several embodiments and variations of the present invention for a soft dessert dispensing arrangement are described in detail herein, it should be apparent that the disclosure and teachings of the present invention will suggest many alternative designs to those skilled in the art.

What is claimed is:

1. A soft dessert dispensing arrangement comprising:
   a. dispenser means, responsive to manual actuation by an operator, for dispensing soft dessert over a given time period, including a timer for measuring the given time period, said timer comprising an electrical timing circuit which is responsive to a resistance value to determine a measured time period; and
   b. compensator means coupled to said timer for adjusting the given time period to compensate for changes in the dispensing operation to provide for the dispensing of a substantially constant quantity of dessert by adjustment of the given time period, said compensator means including means for changing the resistance applied to said electrical timing circuit, and said compensator means also including a timer means for timing the duration since the last vending operation of soft dessert and being responsive thereto for changing the resistance applied to said electrical timing circuit.

2. A soft dessert dispensing arrangement as claimed in claim 1, said electrical timing circuit being composed of a single timer circuit, said dispenser means including actuator means for selecting at least two different size portions by at least two different resistors which are selectively switched into said electrical timing circuit.

3. A soft dessert dispensing arrangement as claimed in claim 1, said compensator means including a temperature transducer coupled to said electrical timing circuit, the resistance of said temperature transducer varying in relation to the temperature of the soft dessert.

4. A soft dessert dispensing arrangement as claimed in claim 1, said dispenser means including a pump, said compensator means including a pressure transducer for measuring the pressure the pump is exerting on the soft dessert during a dispensing operation and providing a different resistance in response thereto.

5. A soft dessert dispensing arrangement as claimed in claim 1, said dispenser means including a motor driven screw auger pump.

6. A soft dessert dispensing arrangement as claimed in claim 1, said dispenser means including a plunger operated dispensing valve, and a solenoid coupled to the plunger of said valve.

7. A soft dessert dispensing arrangement as claimed in claim 1, said dispenser means comprising a manually actuated dispensing lever, a dispensing pump, and a plunger operated dispensing valve, the plunger of which is mechanically coupled to said dispensing lever to be moved thereby to an open valve position upon manual operation of said dispensing lever, and further including a switch which is closed by manual operation of said dispensing lever to supply electrical power to said dispensing pump and to actuate said timer at the initiation of a dispensing operation.

8. A soft dessert dispensing arrangement as claimed in claim 7, said dispensing valve being spring biased closed, means, mechanically coupled to said dispensing valve, for holding said dispensing valve open, and a solenoid which is actuated by said timer at the end of a timing period to cause said holding means to release said dispensing valve, thereby causing said valve to be spring biased closed.

9. A soft dessert dispensing arrangement as claimed in claim 8, including a second plunger positioned adjacent to and being spring biased against one end of the plunger of said plunger valve to spring bias said plunger valve towards a closed position, said second plunger including a radially directed recess therein into which said latch means is spring biased to latch the dispensing valve in an open position, and said solenoid, upon actuation thereof at the end of a timing period, withdrawing said latch means from said radially directed recess to allow said dispensing valve to be spring biased toward a closed position.

* * * * *